United States Patent
Berry et al.

(10) Patent No.: US 6,658,654 B1
(45) Date of Patent: Dec. 2, 2003

(54) METHOD AND SYSTEM FOR LOW-OVERHEAD MEASUREMENT OF PER-THREAD PERFORMANCE INFORMATION IN A MULTITHREADED ENVIRONMENT

(75) Inventors: Robert Francis Berry, Austin, TX (US); Robert Tod Dimpsey, Austin, TX (US); Frank Eliot Levine, Austin, TX (US); Enio Manuel Pineda, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 09/612,348

(22) Filed: Jul. 6, 2000

(51) Int. Cl.⁷ .................................................. G06F 9/44
(52) U.S. Cl. ....................... 717/131; 717/127; 717/130; 717/151
(58) Field of Search .......................... 712/227; 717/131, 717/130, 151, 158, 128, 129

(56) References Cited

U.S. PATENT DOCUMENTS

| | | | |
|---|---|---|---|
| 4,231,106 A | 10/1980 | Heap et al. | 364/900 |
| 5,164,969 A | 11/1992 | Alley et al. | 377/39 |
| 5,485,574 A | 1/1996 | Bolosky et al. | 395/183.11 |
| 5,657,253 A | 8/1997 | Dreyer et al. | 364/551.01 |
| 5,838,976 A | 11/1998 | Summers | 395/704 |
| 5,872,913 A | 2/1999 | Berry et al. | 395/184.01 |
| 5,896,538 A | 4/1999 | Blandy et al. | 395/704 |
| 6,018,759 A | 1/2000 | Doing et al. | 709/108 |
| 6,098,169 A * | 8/2000 | Ranganathan | 712/227 |

FOREIGN PATENT DOCUMENTS

| | | |
|---|---|---|
| JP | 62-125442 | 6/1987 |
| JP | 1-310454 | 12/1989 |
| JP | 6-259245 | 9/1994 |

OTHER PUBLICATIONS

"Intel Architecture Software Developer's Manual; vol. 3: System Programming," 1999, Intel Corp., A–1 to A–22.*

"Performance Information Gathering in a Multiprogramming System", IBM Technical Disclosure Bulletin, v. 14, N. 5, pp. 1348–1349, Oct. 1971.

Saavedra–Barrera et al., "Analysis of Multithreaded Architectures for Parallel Computing", Proc. of 2$^{nd}$ Annual ACM Symposium on Parallel Algorithms and Architectures, pp. 169–178, Jul. 2, 1990.

(List continued on next page.)

Primary Examiner—Tuan Q. Dam
Assistant Examiner—David A. Snyder
(74) Attorney, Agent, or Firm—Leslie A. Van Leeuwen; Joseph R. Burwell

(57) ABSTRACT

A low-overhead performance measurement of an application executing in a data processing system is provided in order to generate per-thread performance information in a multithreaded environment. While a first set of events is being monitored for a particular thread as a first metric, events that may indirectly cause inaccuracies in the first metric, such as thread switches, are also monitored as a second metric. The presence of a positive value for the second metric is then used to determine that the first metric is inaccurate or unreliable, after which the first metric may be discarded; otherwise, the first metric is considered accurate. For example, the first metric may then be considered a thread-relative metric as it has been observed during a time period in which no thread switch events or interrupt events would have caused the first metric to become inaccurate during the execution of a particular thread.

33 Claims, 6 Drawing Sheets

OTHER PUBLICATIONS

"Internal Performance Measurement Counters", IBM Technical Disclosure Bulletin, v. 34, n. 4A, pp. 51–52, Sep. 1991.

Akalaj et al., "Performance of multi–threaded execution in a shared–memory multiprocessor", Proc. of $3^{rd}$ IEEE Symposium on Parallel and Distributed Processing, pp. 330–333, Dec. 2, 1991.

Bohm et al.,"An evaluation of bottom–up and top–down thread generation techniques", Proc. of $26^{th}$ Annual Intl. Symposium on Microarchitecture, pp. 118–127, Dec. 1, 1993.

Rodriguez et al., "A Metric for the Temporal Characterization of Parallel Programs", Journal of Parallel and Distributed Computing, v. 46, n. 2, pp. 113–124, Nov. 1, 1997.

* cited by examiner

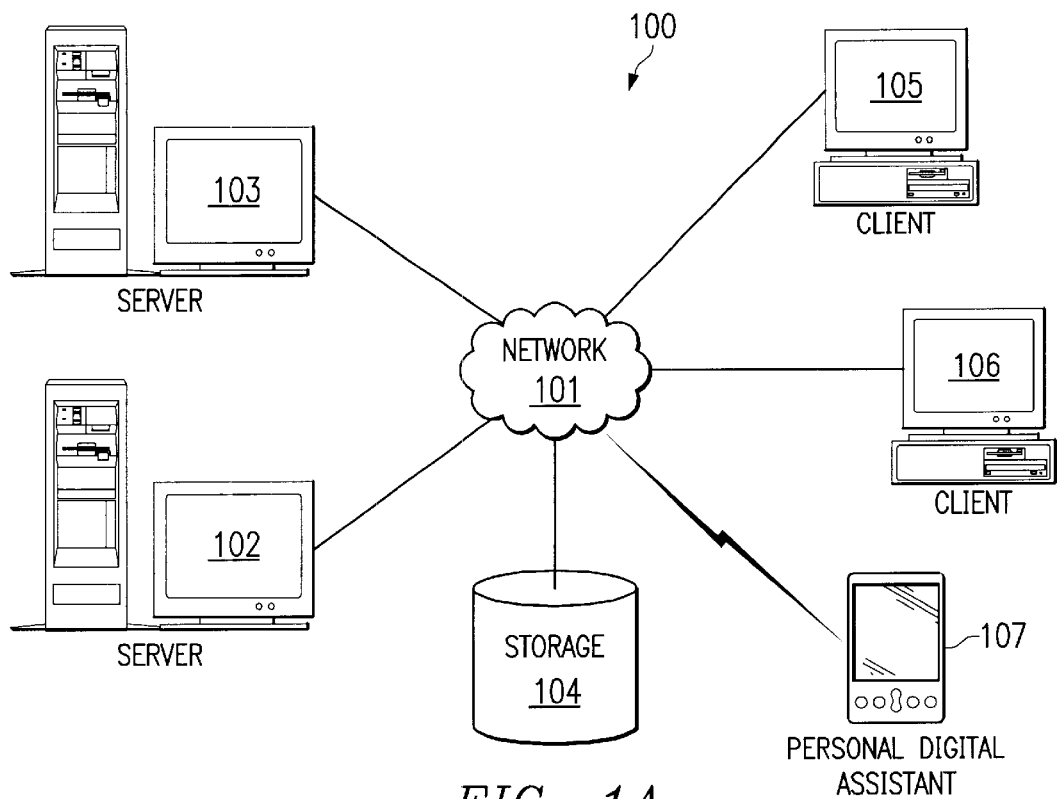
FIG. 1A
(PRIOR ART)
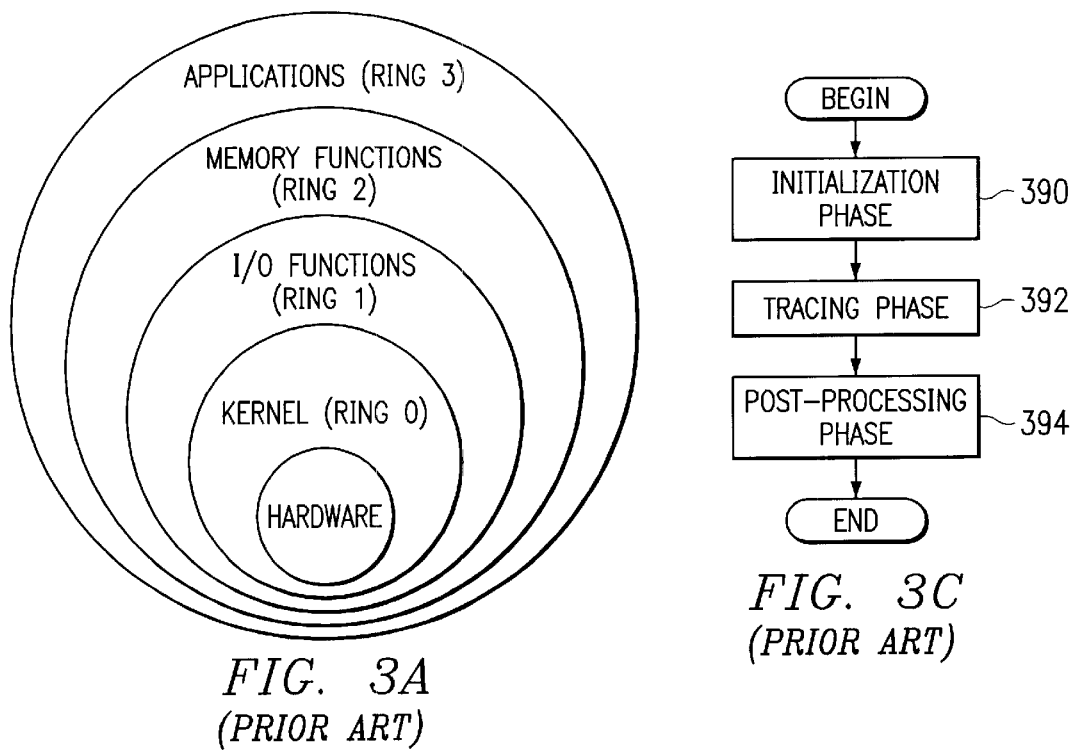
FIG. 3A
(PRIOR ART)
FIG. 3C
(PRIOR ART)

| BITS 0-4 COUNTING ENABLES | BIT 5 INTERRUPT ENABLE | BITS 6-15 | BIT 16 PMC2 INTERRUPT CONTROL | BIT 17 PMC2 INTERRUPT CONTROL | BIT 18 PMC2 COUNT CONTROL | BITS 19-25 PMC1 EVENT SELECTION | BITS 26-31 PMC2 EVENT SELECTION |
|---|---|---|---|---|---|---|---|

METHOD AND SYSTEM FOR LOW-OVERHEAD MEASUREMENT OF PER-THREAD PERFORMANCE INFORMATION IN A MULTITHREADED ENVIRONMENT

BACKGROUND OF THE INVENTION

1. Field of the Invention

The present invention relates to an improved data processing system and, in particular, to a method and apparatus for optimizing performance in a data processing system. Still more particularly, the present invention provides a method and apparatus for a software program development tool for enhancing performance of a software program through performance profiling.

2. Description of Related Art

Effective management and enhancement of data processing systems requires knowing how and when various system resources are being used. In analyzing and enhancing performance of a data processing system and the applications executing within the data processing system, it is helpful to know which software modules within a data processing system are using system resources. Performance tools are used to monitor and examine a data processing system to determine resource consumption as various software applications are executing within the data processing system. For example, a performance tool may identify the most frequently executed modules and instructions in a data processing system, may identify those modules which allocate the largest amount of memory, or may identify those modules which perform the most I/O requests. Hardware-based performance tools may be built into the system and, in some cases, may be installed at a later time, while software-based performance tools may generally be added to a data processing system at any time.

In order to improve performance of program code, it is often necessary to determine how time is spent by the processor in executing code, such efforts being commonly known in the computer processing arts as locating "hot spots." Ideally, one would like to isolate such hot spots at various levels of granularity in order to focus attention on code which would most benefit from improvements.

For example, isolating such hot spots to the instruction level permits compiler developers to find significant areas of suboptimal code generation at which they may focus their efforts to improve code generation efficiency. Another potential use of instruction level detail is to provide guidance to the designer of future systems. Such designers employ profiling tools to find characteristic code sequences and/or single instructions that require optimization for the available software for a given type of hardware.

Most software engineers are more concerned about the efficiency of applications at higher levels of granularity, such as the source code statement level or source code module level. For example, if a software engineer can determine that a particular module requires significant amounts of time to execute, the software engineer can make an effort to increase the performance of that particular module. In addition, if a software engineer can determine that a particular module is sometimes invoked unnecessarily, then the software engineer can rewrite other portions of code to eliminate unnecessary module executions.

Various hardware-based performance tools are available to professional software developers. Within state-of-the-art processors, facilities are often provided which enable the processor to count occurrences of software-selectable events and to time the execution of processes within an associated data processing system. Collectively, these facilities are generally known as the performance monitor of the processor. Performance monitoring is often used to optimize the use of software in a system.

A performance monitor is generally regarded as a facility incorporated into a processor to monitor selected operational characteristics of a hardware environment to assist in the debugging and analyzing of systems by determining a machine's state at a particular point in time or over a period of time. Often, the performance monitor produces information relating to the utilization of a processor's instruction execution and storage control. For example, the performance monitor can be utilized to provide information regarding the amount of time that has passed between events in a processing system. As another example, software engineers may utilize timing data from the performance monitor to optimize programs by relocating branch instructions and memory accesses. In addition, the performance monitor may be utilized to gather data about the access times to the data processing system's L1 cache, L2 cache, and main memory. Utilizing this data, system designers may identify performance bottlenecks specific to particular software or hardware environments. The information produced usually guides system designers toward ways of enhancing performance of a given system or of developing improvements in the design of a new system.

To obtain performance information, events within the data processing system are counted by one or more counters within the performance monitor. The operation of such counters is managed by control registers, which are comprised of a plurality of bit fields. In general, both control registers and the counters are readable and writable by software. Thus, by writing values to the control register, a user may select the events within the data processing system to be monitored and specify the conditions under which the counters are enabled.

In addition to the hardware-based performance tools and techniques discussed above, software-based performance tools may also be deployed in a variety of manners. One known software-based performance tool is a trace tool. A trace tool may use more than one technique to provide trace information that indicates execution flows for an executing application. One technique keeps track of particular sequences of instructions by logging certain events as they occur, so-called event-based profiling technique. For example, a trace tool may log every entry and corresponding exit into and from a module, subroutine, method, function, or system component within the executing application. Typically, a time-stamped record is produced for each such event. Corresponding pairs of records similar to entry-exit records may also be used to trace execution of arbitrary code segments, starting and completing I/O or data transmission, and for many other events of interest. Output from a trace tool may be analyzed in many ways to identify a variety of performance metrics with respect to the execution environment.

However, instrumenting an application to enable trace profiling may undesirably disturb the execution of the application. As the application executes, the instrumentation code may incur significant overhead, such as system calls to obtain a current timestamp or other execution state information. In fact, the CPU time consumed by the instrumentation code alone may effect the resulting performance metric of the application being studied.

Another problem in profiling an application is that unwanted and/or unexpected effects may be caused by the system environment to the state information that the profiling processes are attempting to capture. Since most computer systems are interruptable, multi-tasking systems, the operating system may perform certain actions underneath the profiling processes, unbeknownst to the profiling processes. The most prevalent of these actions is a thread-switch.

While a profiling process is attempting to capture state information about a particular thread, i.e., a thread-relative metric, the system may perform a thread switch. Once the profiling process obtains the state information, the information may have changed due to the thread switch. The subsequent execution of the other thread may render the desired, thread-relative, performance metric partially skewed or completely unreliable. If the profiling process does not perform any actions to determine the prevalence of thread switches, the profiling process cannot determine the reliability of certain performance metrics.

Significant efforts in the prior art have been employed to minimize or negate the effects of thread switches on performance metrics captured for profiling purposes. Typical solutions to tracking performance information on a per-thread basis require significant kernel support because of the need to identify thread dispatch events initiated by the kernel and then to associate the consumed performance metric with these events so that an accurate accounting of resource consumption on each thread can be obtained. Infrastructure to support this kind of accounting can be quite expensive, and in some cases, such as environments that lack an open, extensible, kernel programming interface, the infrastructure may be difficult or impossible to deploy.

Therefore, it would be advantageous to provide a method and system for isolating the thread-relative performance metrics from the effects caused by thread-switching, thereby enhancing the accuracy of thread-relative metrics captured by the profiling processes. It would be particularly advantageous to provide a mechanism that employs the hardware-based efficiencies provided by the performance monitoring facilities of a processor.

SUMMARY OF THE INVENTION

A method, system, apparatus, or computer program product is presented for low-overhead performance measurement of an application executing in a data processing system in order to generate per-thread performance information in a multithreaded environment. While a first set of events is being gathered or monitored for a particular thread as a first metric, events that may indirectly cause inaccuracies in the first metric are also monitored as a second metric, and the presence of a positive value for the second metric is then used to determine that the first metric is inaccurate or unreliable. If the first metric is deemed inaccurate, then the first metric may be discarded. When the first metric is gathered without the occurrence of an event being counted as the second metric, then the first metric is considered accurate. The first metric may then be considered a "thread-relative" metric as it has been observed during a time period in which no events would have caused the first metric to become inaccurate during the execution of a particular thread. For example, the first metric could be a value of a consumed resource, such as a number of executed instructions, while the second metric is a number of interrupts, each of which might cause the kernel to initiate a thread switch. While the interrupt is serviced, the first metric continues to monitor resource consumption, yet the second metric indicates that the first metric is inaccurate with respect to a particular thread.

Within an executing application, a first counter is read to get a first performance metric beginning value, and a second counter is read to get a second performance metric beginning value. These values may be obtained near the entry of a method with which an analyst desires to observe its execution performance. The application then continues to execute. Near the exit of the method, the first counter is read to get a first performance metric ending value, and the second counter is read to get a second performance metric ending value. A first performance metric delta value is then computed from the first performance metric beginning value and the first performance metric ending value, and a second performance metric delta value is computed from the second performance metric beginning value and the second performance metric ending value. A determination can then be made as to whether the first performance metric delta value is reliable as a thread-relative performance metric value representing the first performance metric based upon whether the second performance metric delta value is zero.

In one type of performance observation, the first counter and the second counter are performance monitor counters in a processor in the data processing system, and the performance monitor counters are read directly by application-level code.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1A depicts a typical distributed data processing system in which the present invention may be implemented;

FIG. 3A is a diagram of software components within a computer system that illustrates a logical relationship between the components as layers of functions;

FIG. 3C is a diagram depicting various processing phases that are typically used to develop trace information;

DETAILED DESCRIPTION OF THE INVENTION

Figure 1B:
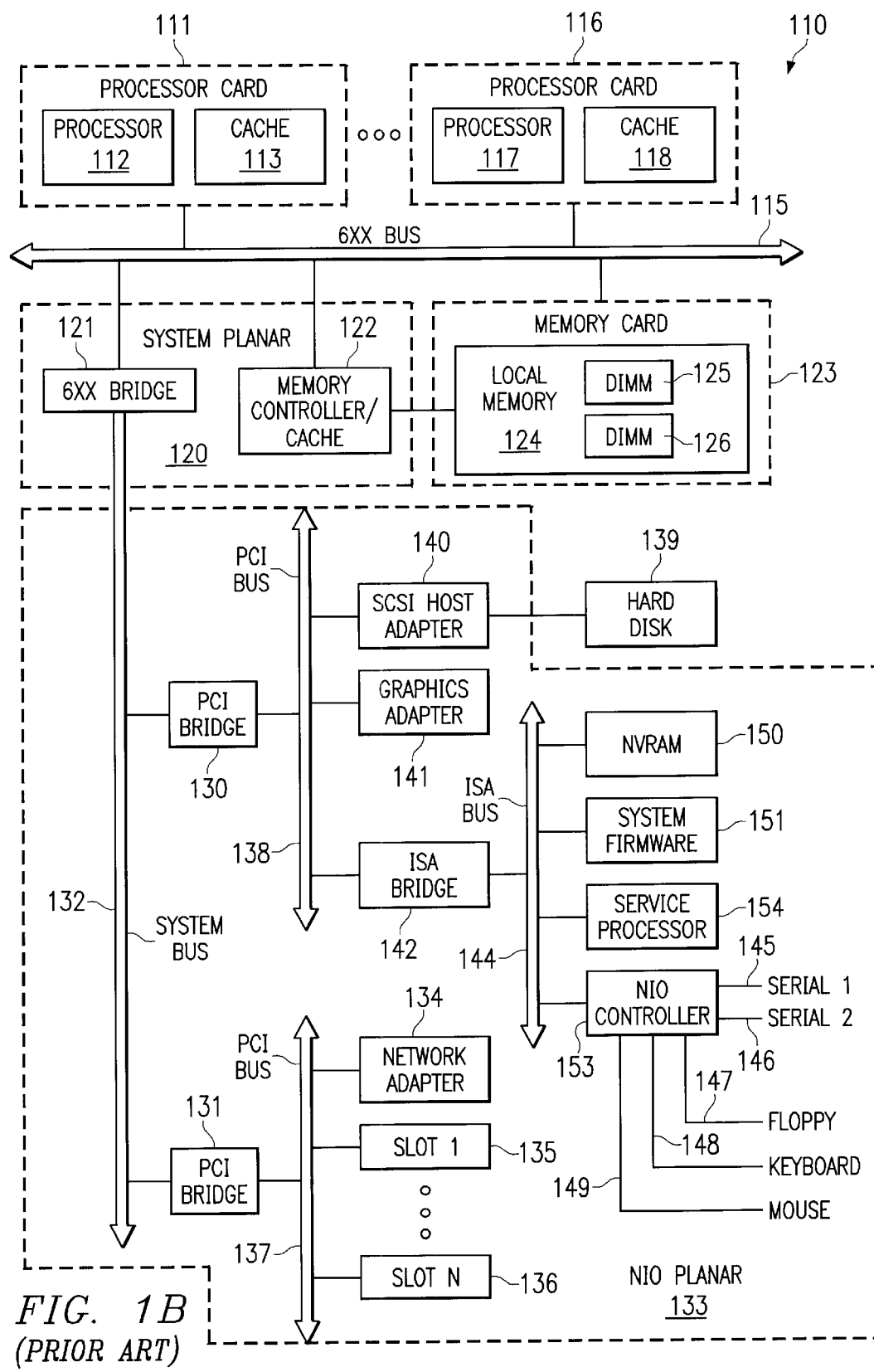
FIG. 1B depicts a typical computer architecture that may be used within a client or server in which the present invention may be implemented.

With reference now to the figures, FIG. 1A depicts a typical distributed data processing system in which the present invention may be implemented. Distributed data processing system 100 contains network 101, which is the medium used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 may be a variety of computing devices, such as personal computers, personal digital assistants (PDAs), etc. Distributed data processing system 100 may include additional servers, clients, and other devices not shown. In the depicted example, distributed data processing system 100 may include the Internet with network 101 representing a worldwide collection of networks and gateways that use the TCP/IP suite of protocols to communicate with one another. Of course, distributed data processing system 100 also may be configured to include a number of different types of networks, such as, for example, an intranet, a local area network (LAN), or a wide area network (WAN).

FIG. 1A is intended as an example of a heterogeneous computing environment and not as an architectural limitation for the present invention. The present invention could be implemented on a variety of hardware platforms, such as server 102 or client 107 shown in FIG. 1A. Requests for the collection of thread-relative metric information may be initiated on a first device within the network, while a second device within the network receives the request, collects the thread-relative metric information with respect to the second device, and returns the collected data to the first device.

With reference now to FIG. 1B, a diagram depicts a typical computer architecture that may be used within a client or server, such as those shown in FIG. 1A, in which the present invention may be implemented. Data processing system 110 employs a variety of bus structures and protocols. Processor card 111 contains processor 112 and L2 cache 113 that are connected to 6XX bus 115. System 110 may contain a plurality of processor cards; processor card 116 contains processor 117 and L2 cache 118.

6XX bus 115 supports system planar 120 that contains 6XX bridge 121 and memory controller 122 that supports memory card 123. Memory card 123 contains local memory 124 consisting of a plurality of dual in-line memory modules (DIMMs) 125 and 126.

6XX bridge 121 connects to PCI bridges 130 and 131 via system bus 132. PCI bridges 130 and 131 are contained on native I/O (NIO) planar 133 which supports a variety of I/O components and interfaces. PCI bridge 131 provides connections for external data streams through network adapter 134 and a number of card slots 135–136 via PCI bus 137. PCI bridge 130 connects a variety of I/O devices via PCI bus 138. Hard disk 139 may be connected to SCSI host adapter 140, which is connected to PCI bus 138. Graphics adapter 141 may also be connected to PCI bus 138 as depicted, either directly or indirectly.

ISA bridge 142 connects to PCI bridge 130 via PCI bus 138. ISA bridge 142 provides interconnection capabilities through NIO controller 153 via ISA bus 144, such as serial connections 145 and 146. Floppy drive connection 147 provides removable storage. Keyboard connection 148 and mouse connection 149 allow data processing system 110 to accept input data from a user.

Non-volatile RAM (NVRAM) 150 provides non-volatile memory for preserving certain types of data from system disruptions or system failures, such as power supply problems. System firmware 151 is also connected to ISA bus 144 and controls the initial BIOS. Service processor 154 is connected to ISA bus 144 and provides functionality for system diagnostics or system servicing.

Those of ordinary skill in the art will appreciate that the hardware in FIG. 1B may vary depending on the system implementation. For example, the system may have one or more processors, and other peripheral devices may be used in addition to or in place of the hardware depicted in FIG. 1B. The depicted examples are not meant to imply architectural limitations with respect to the present invention.

Figures 2A, 2B:
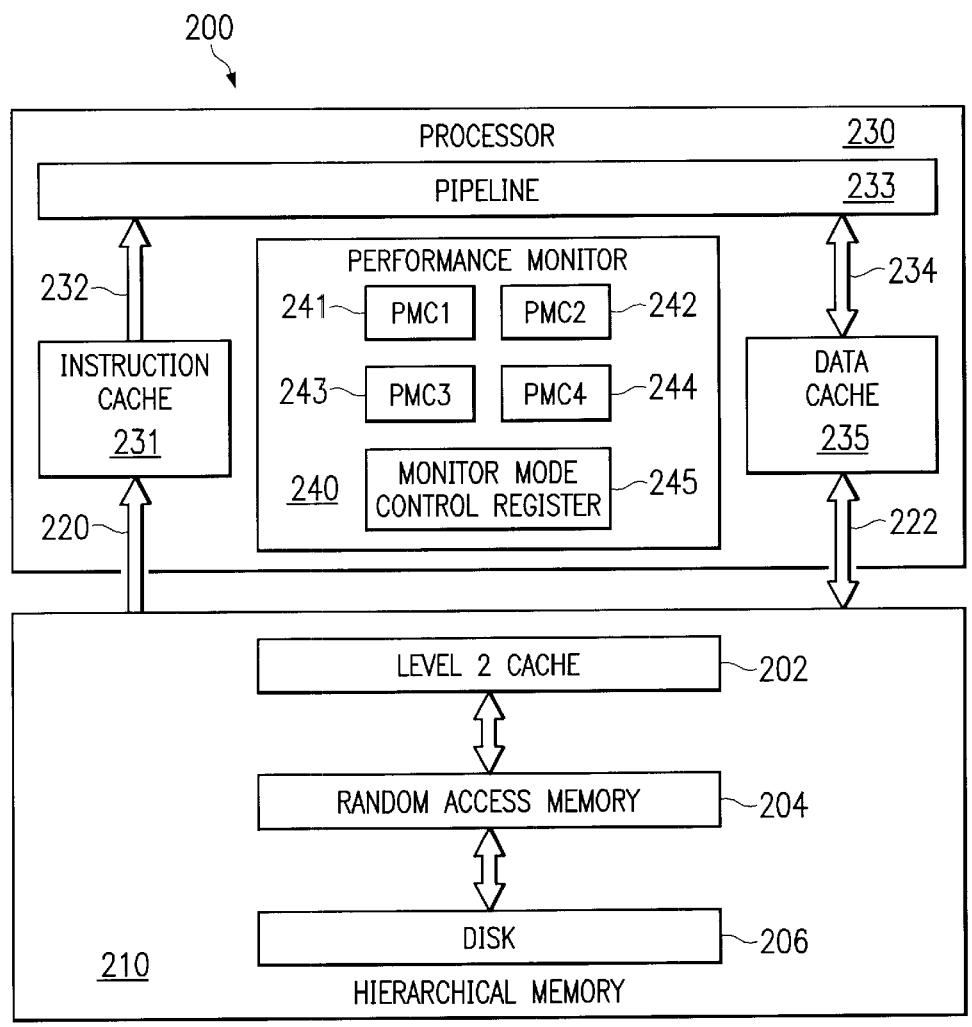
FIG. 2A is a block diagram depicting typical internal functional units of a data processing system in which the present invention may be implemented.
FIG. 2B is an illustration depicting an example representation of one configuration of an MMCR suitable for controlling the operation of two PMCs.

With reference now to FIG. 2A, a block diagram depicts selected internal functional units of a data processing system that may include the present invention. System 200 comprises hierarchical memory 210 and processor 230. Hierarchical memory 210 comprises Level 2 cache 202, random access memory (RAM) 204, and disk 206. Level 2 cache 202 provides a fast access cache to data and instructions that may be stored in RAM 204 in a manner which is well-known in the art. RAM 204 provides main memory storage for data and instructions that may also provide a cache for data and instructions stored on nonvolatile disk 206.

Data and instructions may be transferred to processor 230 from hierarchical memory 210 on instruction transfer path 220 and data transfer path 222. Instruction transfer path 220 and data transfer path 222 may be implemented as a single bus or as separate buses between processor 230 and hierarchical memory 210. Alternatively, a single bus may transfer data and instructions between processor 230 and hierarchical memory 210 while processor 230 provides separate instruction and data transfer paths within processor 230, such as instruction bus 232 and data bus 234.

Processor 230 also comprises instruction cache 231, data cache 235, performance monitor 240, and instruction pipeline 233. Performance monitor 240 comprises performance monitor counter (PMC1) 241, performance monitor counter (PMC2) 242, performance monitor counter (PMC3) 243, performance monitor counter (PMC4) 244, and monitor mode control register (MMCR) 245. Alternatively, processor 230 may have other counters and control registers not shown.

Processor 230 includes a pipelined processor capable of executing multiple instructions in a single cycle, such as the PowerPC family of reduced instruction set computing (RISC) processors. During operation of system 200, instructions and data are stored in hierarchical memory 210. Instructions to be executed are transferred to instruction pipeline 233 via instruction cache 231. Instruction cache 231 contains instructions that have been cached for execution within pipeline 233. Some instructions transfer data to or from hierarchical memory 210 via data cache 235. Other instructions may operate on data loaded from memory or may control the flow of instructions.

Performance monitor 240 comprises event detection and control logic, including PMC1–PCM4 241–244 and MMCR 245. Performance monitor 240 is a software-accessible mechanism intended to provide detailed information with significant granularity concerning the utilization of processor instruction execution and storage control. The performance monitor may include an implementation-dependent number of performance monitor counters (PMCs) used to count processor/storage related events. These counters may also be termed "global counters". The MMCRs establish the function of the counters with each MMCR usually controlling some number of counters. The PMCs and the MMCRs are typically special purpose registers physically residing on the processor. These registers are accessible for read or write operations via special instructions for that purpose. The write operation is preferably only allowed in a privileged or supervisor state, while reading is allowed in a problem state since reading the special purpose registers does not change a register's content. In a different embodiment, these registers may be accessible by other means such as addresses in I/O space. One skilled in the art will appreciate that the size and number of the counters and the control registers are dependent upon design considerations, including the cost of manufacture, the desired functionality of processor 230, and the chip area available within processor 230.

Performance monitor 240 monitors the entire system and accumulates counts of events that occur as the result of processing instructions. The MMCRs are partitioned into bit fields that allow for event/signal selection to be recorded/counted. Selection of an allowable combination of events causes the counters to operate concurrently.

With reference now to FIG. 2B, an illustration provides an example representation of one configuration of an MMCR suitable for controlling the operation of two PMCs. As shown in the example, an MMCR is partitioned into a number of bit fields whose settings select events to be counted, enable performance monitor interrupts, and specify the conditions under which counting is enabled.

For example, given that an event under study is "register accesses", a PMC may represent the number of register accesses for a set of instructions. The number of register accesses for the particular set of instructions might be added to the total event count in a PMC that counts all register accesses by all instructions in a particular time period. A user-readable counter, e.g., PMC1, may then provide a software-accessible number of register accesses since PMC1 was first initialized. With the appropriate values, the performance monitor is readily configured for use in identifying a variety of system performance characteristics.

Bits 0–4 and 18 of the MMCR in FIG. 2B determine the scenarios under which counting is enabled. By way of example, bit 0 may be a freeze-counting bit such that when the bit is set, the values in the PMCs are not changed by hardware events, i.e. counting is frozen. Bits 1–4 may indicate other specific conditions under which counting is performed. Bits 5, 16, and 17 are utilized to control interrupt signals. Bits 6–15 may be utilized to control time or event-based transitions. Bits 19–25 may be used for event selection for PMC1, i.e. selection of signals to be counted for PMC1. Bits 26–31 may be used for event selection for PMC2, i.e. selection of signals to be counted for PMC2. The function and number of bits may be chosen as necessary for selection of events as needed within a particular implementation.

In addition to being able to be implemented on a variety of hardware platforms, the present invention may be implemented in a variety of software environments. Although the methodology of the present invention may be applied to any general software environment, the following examples illustrate the present invention applied to a Java environment.

With reference now to FIG. 3A, a prior art diagram shows software components within a computer system illustrating a logical relationship between the components as layers of functions. The kernel (Ring 0) of the operating system provides a core set of functions that acts as an interface to the hardware. I/O functions and drivers can be viewed as resident in Ring 1, while memory management and memory-related functions are resident in Ring 2. User applications and other programs (Ring 3) access the functions in the other layers to perform general data processing. Rings 0–2, as a whole, may be viewed as the operating system of a particular device. Assuming that the operating system is extensible, software drivers may be added to the operating system to support various additional functions required by user applications, such as device drivers for support of new devices added to the system.

Figure 3B:
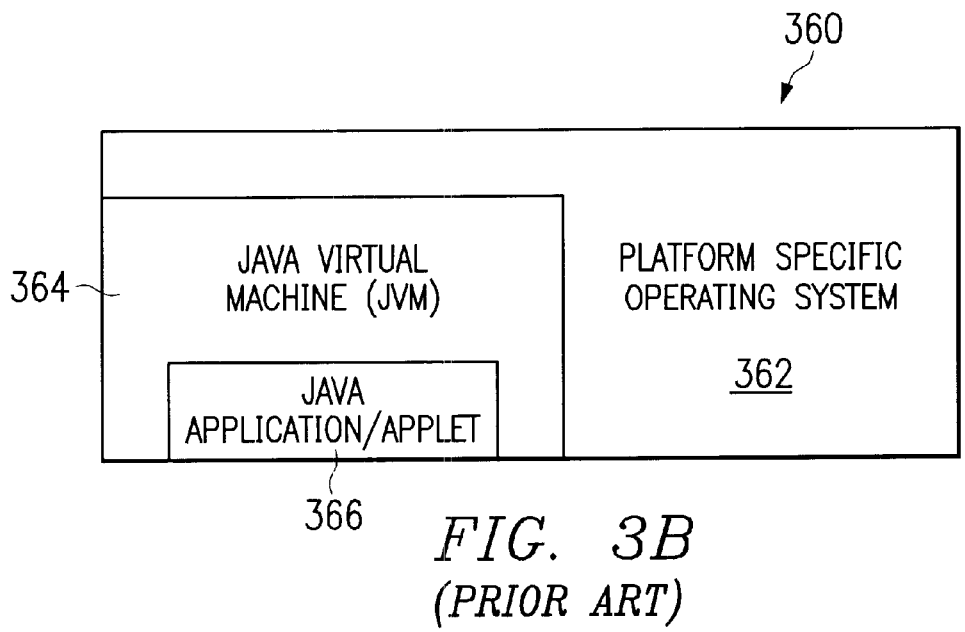
FIG. 3B illustrates a typical relationship of software components within a computer system that supports a Java environment in which the present invention may be implemented.

With reference now to FIG. 3B, a block diagram illustrates a typical relationship of software components within a computer system that supports a Java environment in which the present invention may be implemented. Java-based system 360 contains platform specific operating system 362 that provides hardware and system support to software executing on a specific hardware platform. The operating system generally supports the simultaneous execution of multiple applications, and the Java Virtual Machine (JVM) 364 is one software application that may execute in conjunction with the operating system. JVM 364 provides a Java runtime environment with the ability to execute Java application or applet 366, which is a program, servlet, or software component written in the Java programming language. The computer system in which JVM 364 operates may be similar to data processing system 110 shown in FIG. 1B. However, JVM 364 may be implemented in dedicated hardware on a so-called Java chip or Java processor with an embedded JVM core.

At the center of a Java runtime environment is the JVM, which supports all aspects of Java's environment, including its architecture, security features, mobility across networks, and platform independence. The JVM is a virtual computer, i.e. a computer that is specified abstractly. The Java specifications define certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for a variety of hardware platforms, such as mainframe computers and PDAs.

With reference now to FIG. 3C, a diagram depicts various processing phases that are typically used to develop trace information. Trace records may be produced by the execution of small pieces of code called "hooks". Hooks may be inserted in various ways into the code executed by processes, including statically (source code) and dynamically (through modification of a loaded executable). After hooks have already been inserted into the process or processes of interest, i.e., after the code has been "instrumented", then profiling may be performed. Instrumented code is not typically present in production quality code because instrumentation changes the size and performance of the code to be analyzed; hence, instrumented code is typically not delivered within a final version of an application. After an application has been instrumented with trace hooks, the application may be executed, and the generated trace information is captured and analyzed, as shown in FIG. 3C.

An initialization phase 390 is used to capture the state of a machine at the time tracing is initiated. This trace initialization data may include trace records that identify all existing threads, all loaded classes, and all methods for the loaded classes. A record may be written to indicate when all of the startup information has been written.

Next, during the tracing phase 392, trace records are written to a trace buffer or trace file. Trace hooks may be used to record data upon the execution of the hook, which is a specialized piece of code at a specific location in a routine, module, or program. Trace hooks are typically inserted for the purpose of debugging, performance analysis, or enhancing functionality. These trace hooks may generate trace data that is stored in a trace data buffer. The trace data buffer may be subsequently stored in a file for post-processing. Trace records captured from hooks are written to indicate thread switches, interrupts, loading and unloading of classes and jitted methods, etc. Subject to memory constraints, the generated trace output may be as long and as detailed as the analyst requires for the purpose of profiling a particular program.

In the post-processing phase 394, the data collected in the trace file is analyzed. Each trace record may be processed in a serial manner. Trace records may contain a variety of information. A trace record may identify, directly or indirectly, the thread and method that was being executed at the time that the trace record was generated; this information may be generated originally as binary identifiers that are subsequently converted to text strings. After all of the trace records are processed, the information may be formatted for output in the form of a report or may be used for other post-processing activities.

More information about tracing and trace processing may be found in the following patent applications: "PROCESS AND SYSTEM FOR MERGING TRACE DATA FOR PRIMARILY INTERPRETED METHODS", U.S. application Ser. No. 09/343,439, currently pending, filed on Jun. 30, 1999; and "METHOD AND SYSTEM FOR MERGING EVENT-BASED DATA AND SAMPLED DATA INTO POSTPROCESSED TRACE OUTPUT", U.S. application Ser. No. 09/343,438, currently pending, filed on Jun. 30, 1999.

The present invention may be implemented on a variety of hardware and software platforms, as described above. More specifically, though, the present invention is directed to a technique of allowing for the accurate collection of thread-relative performance metrics. The technique includes some loss of information, i.e. it is heuristic in nature. However, in controlled environments, such as benchmarks, or in heavily repetitious environments, such as server application environments, the technique yields useful results.

As noted previously, obtaining accurate thread-relative metrics is generally difficult. Since most computer systems are interruptable, multi-tasking systems, the operating system may perform a thread-switch underneath the profiling processes, unbeknownst to the profiling processes. While a profiling process is attempting to capture state information about a particular thread, i.e., a thread-relative metric, the system may perform a thread switch. By the time that the profiling process actually obtains the state information, the desired information may have changed due to the thread switch. The subsequent execution of a different thread may render the desired, per-thread, performance metric partially skewed or completely unreliable. If the profiling process does not perform any actions to determine the prevalence of thread switches, the profiling process cannot determine the reliability of certain performance metrics.

As an illustration, consider the problem of tracking the number of instructions executed between the start and the end of a method in a Java application. This type of information may be useful for comparing the number of executed instructions in different versions of a method to determine which version is more efficient in CPU time or other computational resources.

Figure 4:
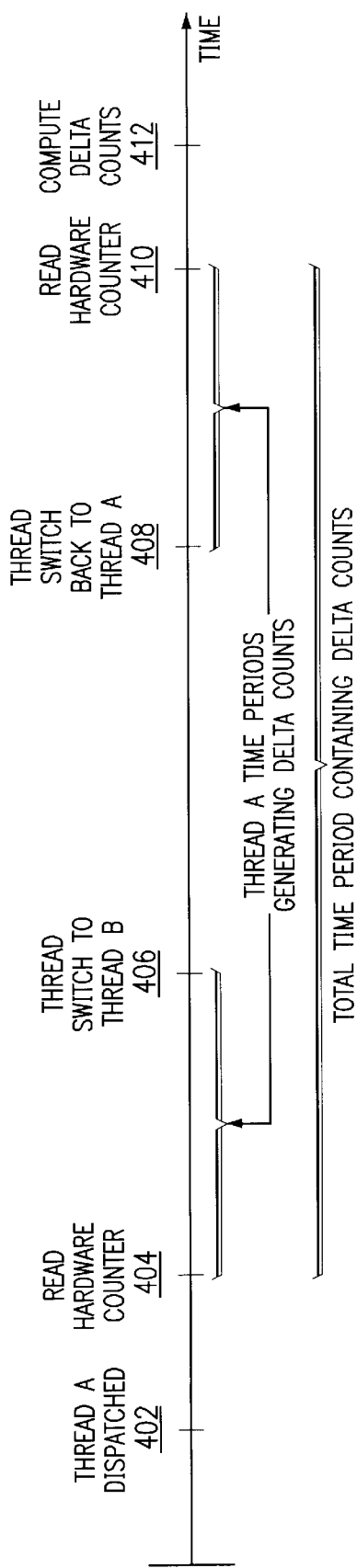
FIG. 4 shows a timeline depicting the temporally relative positions of events concerning a typical problem in measuring a performance metric in a multithreaded environment.

With reference now to FIG. 4, a timeline depicts the temporally relative positions of events concerning a typical problem in measuring a performance metric in a multi-threaded environment. In this explanation; the example specifically addresses the problem of measuring the number of instructions executed in a Java method. However, any specific section of code could be bracketed by a set of operations that attempt to discern a performance metric.

At time point 402, the kernel dispatches thread A, which may comprise several methods. At the start of one of those methods, at time point 404, a hardware counter is read and its value stored in another processor register or a memory location. The hardware counter may be a performance monitor counter that has been previously configured to count the number of instruction completion events within the processor that is executing thread A. The value of the first reading of the performance monitor counter acts as a base value for a subsequent comparison.

Unbeknownst to thread A, the kernel then performs a thread switch at time point 406. The processor continues to execute instructions and to count the instruction completion events; the fact that the instructions represent separate execution threads is not relevant to the operation of the performance monitor counters.

At time point 408, the kernel performs another thread switch during which thread A is activated and thread B is suspended. At the end of the same method, at time point 410, the same hardware counter that represents completed instruction events is again interrogated, and at time point 412, the two instruction counts are compared to compute an instruction count difference or delta. The method may then report the delta as the number of instructions executed within itself.

As can be seen, since execution control was lost by thread A in the midst of the method, its accounting is in error and includes instruction completion events that occurred while thread B had execution control. The present invention attempts to mitigate such effects so that accurate, thread-relative metrics can be obtained.

Significant efforts in the prior art have been employed to minimize or negate the effects of thread switches on thread-relative performance metrics captured for profiling purposes. Typical solutions to tracking performance information on a per-thread basis generally require significant amounts of kernel support because of the need to identify thread dispatch events initiated by the kernel and then to associate the consumed performance metric with these events so that an accurate accounting of resource consumption on each thread can be obtained. For example, some of these prior art solutions actually track performance monitor counter values within the kernel at interrupt times and at thread dispatch, thereby incurring a long path length in the interrupt and dispatch execution paths. Kernel data structures that correspond with user space (and kernel space)

threads are used to accumulate the needed performance monitor counter values. These values can be interrogated from the ring 3 or application level on method entry and exit; however, a system call is required to obtain access to these kernel data structures. The data structures cannot simply be mapped into the application level because they are complex and require serialization (or locking) to access them safely. Infrastructure to support this kind of accounting can be quite expensive, and in some cases, such as environments that lack an open, extensible, kernel programming interface, the infrastructure may be difficult or impossible to deploy.

The technique employed by a first embodiment of the present invention relies on the following observations and assumptions. In most instances, for most function or method calls, a function or method completes without interruption. However, an active function or method may be forced to relinquish control of a CPU for several reasons: (1) a timer interrupt, originally requested by the operating system to apportion time slices to threads, is received by the operating system, thereby causing the operating system to suspend the currently active thread (and its methods); (2) a hardware interrupt is received and requires appropriate servicing; and (3) the currently executing thread is blocked while waiting for the completion of an input/output action or the relinquishment of some type of lock.

The first embodiment of the present invention recognizes that meaningful, thread-relative metrics at the application level may be obtained directly from the hardware in most cases, even though thread-switches may occur at any time as determined by the kernel. Rather than attempting to track thread switches by somehow obtaining kernel-level information concerning thread switches, the first embodiment of the present invention instead performs the following novel actions. While a first set of events is being gathered or monitored for a particular thread as a first metric, events that may indirectly cause a thread switch are also monitored as a second metric, and the presence of positive value for the second metric is then used to determine that the first metric is inaccurate or unreliable. If the first metric is deemed unreliable, then the first metric is discarded, and the fact that the sample was discarded is then recorded in order to provide an indication of the reliability of the thread-relative measurements.

In this manner, the kernel-level information concerning thread-switches is by-passed, and hence, the difficulties in obtaining kernel-level information about thread-switches is eliminated. When the first metric is gathered without the occurrence of an event being counted as the second metric, then the first metric is considered accurate. The first metric may then be considered a "thread-relative" metric as it has been gathered during a time period in which no events would have caused the kernel to initiate a thread switch. If the second metric is positive, then the first metric is discarded, and that fact may be recorded.

In an alternative scenario, rather than being concerned only about events that cause a thread switch, one may also monitor asynchronous events, e.g., timer interrupts, that may not cause a thread switch yet obtain execution control and cause resources to be consumed, thereby affecting the counted events for the thread of interest. These types of asynchronous events may also be monitored as a second metric, and the presence of a positive value for the second metric is then used to determine that the first metric is inaccurate or unreliable.

Hence, the first embodiment of the present invention can perform thread-relative performance accounting at the application level with low overhead. A particular metric is computed from values obtained directly from the hardware, and the metric is determined to be a thread-relative metric based on other metric values obtained directly from the hardware.

Returning to the example of tracking the number of instructions executed between the start and the end of a method in a Java application, the advantage of the first embodiment of the present invention can be observed.

Figure 5:
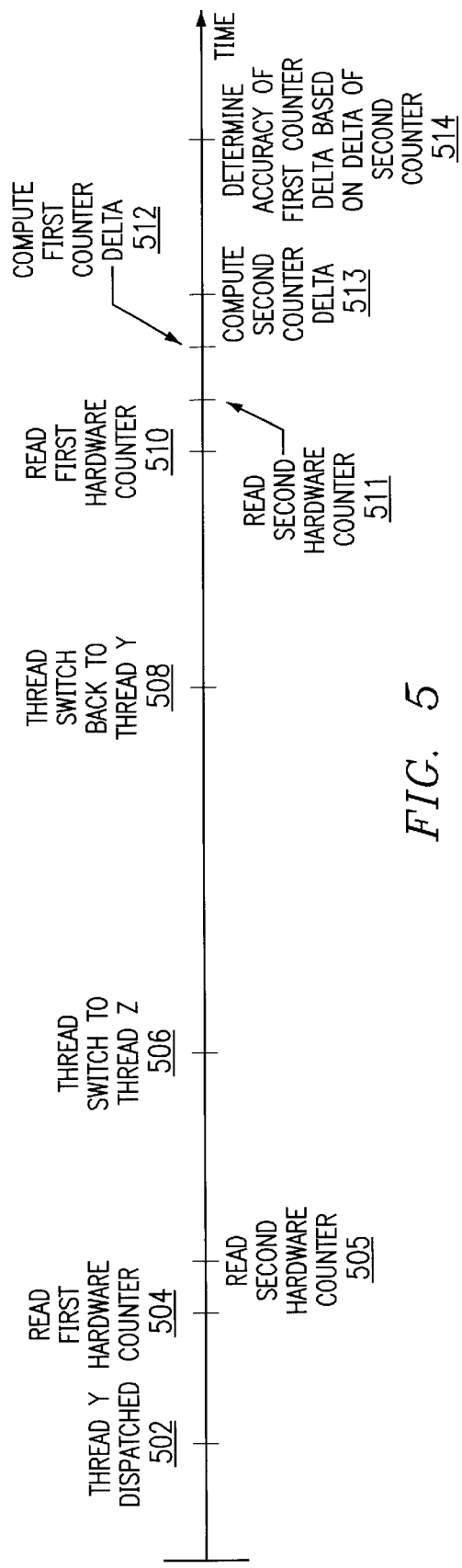
FIG. 5 shows a timeline depicting the temporally relative positions of events concerning the measurement of a performance metric in a multithreaded environment in accordance with a first embodiment of the present invention.

With reference now to FIG. 5, a timeline depicts the temporally relative positions of events concerning the measurement of a performance metric in a multithreaded environment in accordance with a first embodiment of the present invention. In this explanation, the example specifically addresses the problem of measuring the number of instructions executed in a Java method. At time point 502, the kernel dispatches thread Y, which may comprise several methods. At the start of one of those methods, at time point 504, a first hardware counter is read and its value stored in another processor register or a memory location. The first hardware counter may be a first performance monitor counter that has been previously configured to count the number of instruction completion events within the processor that is executing thread Y. The value of the first reading of the first performance monitor counter acts as a base value for a subsequent comparison.

Immediately after reading the first performance monitor counter, at time point 505, a second hardware counter can be read and its value stored in a processor register or a memory location. The second hardware counter may be a second performance monitor counter that has been previously configured to count the number of hardware interrupt events within the processor. The value of the first reading of the second performance monitor counter acts as a base value for a subsequent comparison.

Unbeknownst to thread Y, the kernel then performs a thread switch at time point 506. The processor continues to execute instructions and to count the instruction completion events and interrupts, if necessary; the fact that the instructions represent separate execution threads is not relevant to the operation of the performance monitor counters.

At time point 508, the kernel performs another thread switch during which thread Y is activated and thread Z is suspended. At the end of the same method, at time point 510, the first hardware counter is again interrogated, and at the end of the same method, at time point 511, the second hardware counter is again interrogated. At time point 512, the two instruction counts are compared to compute an instruction count difference or delta. At time point 513, the two interrupt counts are compared to compute an interrupt count difference or delta.

In this example, since the kernel performs at least two thread switches from thread Y to thread Z back to thread Y, at least two interrupts have occurred to initiate the thread switches. The number of interrupts being counted by the second performance monitor counter is greater at time point 511 than at time point 506, and the computed instruction count delta is deemed inaccurate at time point 514.

In general, if any hardware interrupts have occurred during the time period being studied, then the accuracy of the first counter is deemed inaccurate. If no interrupts have occurred, then the method may report the delta as the number of instructions executed within itself.

Figure 6A:
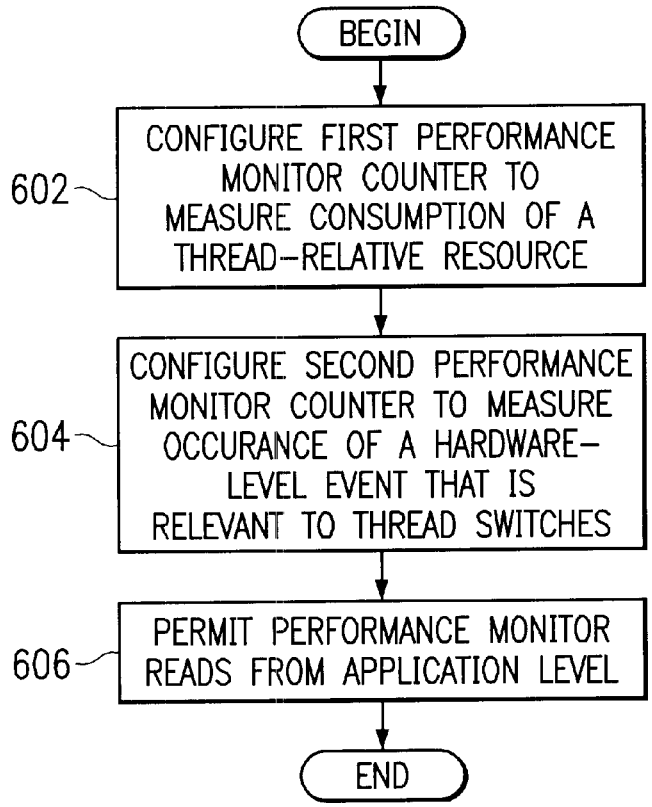
FIG. 6A is a flowchart depicting the steps that may be necessary to configure a processor for counting events in accordance with a first embodiment of the present invention.

With reference now to FIG. 6A, a flowchart depicts the steps that may be necessary to configure a processor for counting events in accordance with a first embodiment of the present invention. A first performance monitor counter is configured to measure the consumption of a thread-relative resource, such as counting the number of executed instructions (step 602). A second performance monitor counter is configured to measure occurrence of a hardware-level event that is relevant to thread switches, such as interrupts (step 604). For example, a monitor mode control register in the processor can be configured to control the performance monitor counters by executing one or more specialized instructions for this purpose.

If necessary, an optional step may need to be performed to permit application-level read operations of the performance monitor counters (steps 606). For example, depending upon the processor, the specialized instructions for controlling the performance monitor registers might initially be available only to privileged processes, such as kernel-level processes. Before application-level operations can be performed on the performance monitor, the kernel may need to perform some operation, such as executing one or more special instructions, to enable the application-level operations. The steps shown in FIG. 6B merely represent that the processor may have to be configured in some manner before application-level operations may be performed, and the specific steps may be dependent upon the hardware platform on which the present invention is implemented.

Figures 6B, 7:
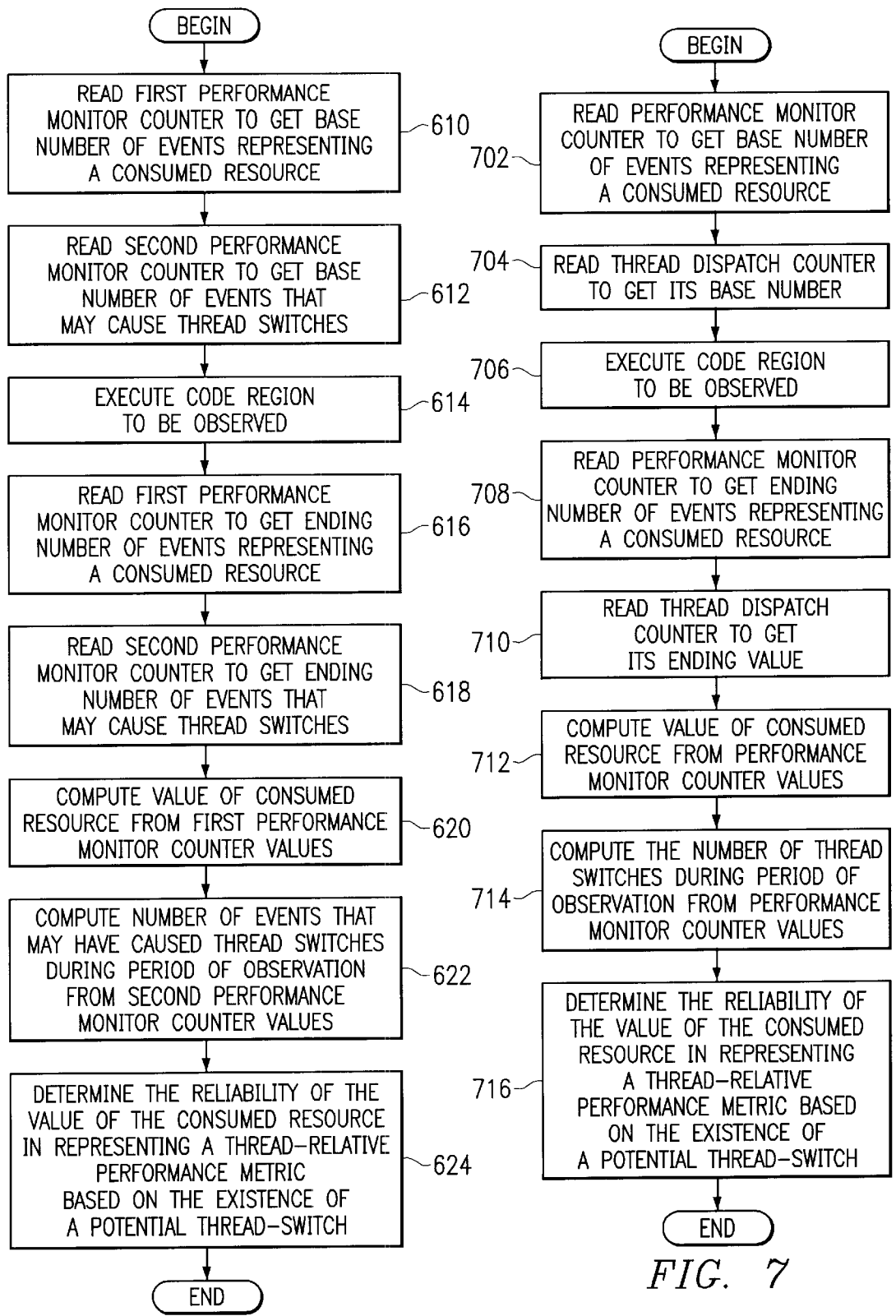
FIG. 6B is a flowchart depicting the process of determining the value of a thread-relative performance metric and its validity using two performance monitor counters in accordance with a first embodiment of the present invention.
FIG. 7 is a flowchart depicting the process of determining the value of a thread-relative performance metric and its validity using a performance monitor counter and a kernel-derived thread dispatch counter in accordance with a second embodiment of the present invention.

With reference now to FIG. 6B, a flowchart depicts the process of determining the value of a thread-relative performance metric and its validity using two performance monitor counters in accordance with a first embodiment of the present invention. The process shown in FIG. 6B may follow the process shown in FIG. 6A immediately or at a much later point in time.

The process begins by reading a first performance monitor counter to get a base number of events representing a consumed resource (step 610). A difference operation is performed during the period under observation because most hardware environments do not allow application-level writes to the performance monitor registers. Therefore, the application cannot initialize the performance monitor counters to zero. The process continues by reading a second performance monitor counter to get a base number of events that may cause thread switches (step 612). A region of code is then executed while various hardware operations are observed by the performance monitor (step 614).

The process continues by reading the first performance monitor counter to get the ending number of events representing a consumed resource (step 616), and the second performance monitor counter is read to get an ending number of events that may cause thread switches (step 618). The value of the consumed resource is computed from the values that were read from the first performance monitor counter (step 620). A number of events that could have caused potential thread switches is computed from the values that were read from the second performance monitor counter (step 622). The reliability of the value of the consumed resource in representing a thread-relative performance metric is then determined from the existence of a potential thread switch, i.e. an increase in the value of the second performance monitor counter (step 624).

The advantages of the first embodiment of the present invention should be apparent in view of the detailed description of the invention that is provided above. The entire process is performed relatively simply, and the reading of the performance monitor counters requires very low overhead. Another advantage is that the process does not require special kernel instrumentation.

However, one disadvantage of the first embodiment of the present invention is that the process may discard the thread-relative performance metric too often. Although the kernel may perform a thread switch immediately after an interrupt in response to the interrupt, it does not necessarily always perform a thread switch after each interrupt. Hence, an interrupt may occur that does not cause a thread switch, but through the methodology of reading a performance monitor counter directly, each interrupt will be considered to have caused a thread switch. In this manner, even though most methods, functions, or sections of code may complete without an intervening interrupt, the methodology may "overcount" the number of thread switches by considering each interrupt as having a one-to-one correspondence with a thread switch. For example, certain system calls may generate a "soft" interrupt that is directly attributable to the immediately preceding system call, and the interrupt should not disrupt the performance monitoring process and cause the performance metric to be discarded. In other words, any resource consumed while servicing such interrupts for system calls should be attributed to the calling thread.

Another disadvantage is that, in certain cases, some resource consumption may be counted that ideally would not be counted. For example, suppose that there is no interrupt and no thread switch during the execution of a method that is being timed or measured, but the thread executes some type of sleep function that places the thread in sleep mode for a particular time period. The thread has yielded control of the processor for a small period of time, yet the thread was not actually executing instructions during that time. Other examples of undercounting and overcounting could also illustrate similar problems.

The second embodiment of the present invention uses a methodology similar to the first embodiment of the present invention, but an attempt is made to obtain a more accurate result. By extending existing kernel functionality to count thread dispatches and/or asynchronous interrupts or other desired events, and then making the count available to an application, a more accurate but still very efficient methodology is presented for characterizing thread-relative resource consumption at the application level. Hence, the "overcounting" or "undercounting" of the first embodiment is remedied by having an accurate count of asynchronous interrupts, or thread switches, or other events from the kernel level.

An additional benefit of this approach is that some of the consumption of resources that otherwise would not have been captured by the methodology used in the first embodiment of the present invention are then properly captured in the thread-relative metric. For example, the monitored thread may cause a particular interrupt, and the consumption of resources during the handling of that particular interrupt should be attributed to the thread and captured in the thread-relative performance metric. By not discarding the performance monitor counter after certain interrupts, as might occur with the methodology of the first embodiment of the present invention, the accurate retrieval of a thread switch count from the kernel level provides a more accurate performance metric. Hence, the consumption of resources is captured in the thread-relative performance metric during specialized processing that was caused by the thread being monitored for the thread-relative performance metric.

With reference now to FIG. 7, a flowchart depicts the process of determining the value of a thread-relative performance metric and its validity using a performance monitor counter and a kernel-derived thread dispatch counter in accordance with a second embodiment of the present invention.

A thread dispatch counter is maintained at the kernel level. As the kernel dispatches a thread, either by spawning a new thread or activating a sleeping thread, the kernel increments the thread dispatch counter. The kernel provides some manner for allowing applications to read the thread dispatch counter, i.e. the thread dispatch counter is effectively mapped to the application level.

As an example of how the application may have quick, efficient access to the thread dispatch counter, the thread dispatch counter may be a global counter that is maintained by the kernel in a kernel-mapped memory area. The kernel has previously mapped an area of memory for user-space access. Ring 3 access to the global counter is provided through a simple read of a variable and not through a system call.

Again, although a thread dispatch counter is used as the second performance metric in the example, the second performance metric stored in memory may represent another consumed resource or another observed event that disqualifies or invalidates the first performance metric obtained from the performance monitor.

In a manner similar to that shown in FIG. 6A, a configuration process may be required to initialize the performance monitor counter and the kernel. For example, the application to be monitored may have been instrumented, and its instrumentation code may call a function within the interface to the kernel that allows the kernel to perform its own initialization, which might also include configuring the performance monitor.

After an optional configuration, the process begins by reading a performance monitor counter to get a base number of events representing a consumed resource (step 702). A thread dispatch counter is read to get a base number for the thread dispatches (step 704). A region of code is then executed while various hardware operations are observed by the performance monitor (step 706).

The process continues by reading the performance monitor counter to get the ending number of events representing a consumed resource (step 708), and the thread dispatch counter is read to get its ending number (step 710). The value of the consumed resource is computed from the values that were read from the performance monitor counter (step 712). A number of thread dispatches is computed from the values that were read from the second performance monitor counter (step 714). The reliability of the value of the consumed resource in representing a thread-relative performance metric is then determined from the existence of a thread dispatch, i.e. a non-zero difference between the base number of thread dispatches and the ending value of the thread dispatch counter (step 716). If a thread dispatch has occurred during the execution of the section of code that is being observed, then the observed value for the consumed resource is deemed unreliable as it possibly also contains the consumption of the resource by at least one other thread.

The advantages of the second embodiment of the present invention should be apparent in view of the detailed description of the invention that is provided above. Similar to the first embodiment, the entire process is performed relatively simply, and the reading of the performance monitor counters requires very low overhead. Additionally, only a single performance monitor counter is used, and because there are only a limited number of these counters in a processor, the light use of performance monitor counters may be important to the execution environment. Although the process in the second embodiment does require a small amount of special kernel instrumentation, it is also performed relatively simply with relatively low overhead.

A third embodiment of the present invention is similar to the second embodiment of the present invention. However, rather than having the application read a performance monitor counter to track the consumption of a resource, the kernel may track the consumption of a resource and also provide this value at the ring 3 or application level in a kernel-mapped memory area that is user-space accessible. Hence, the application can simply read kernel-maintained global counters to obtain both the thread dispatch counter (or asynchronous interrupt or other event or resource of interest) and the counter value representing the consumption of a particular resource. In any case, the value of the first performance metric is employed to determine the reliability of the value representing the consumption of a resource or the second performance metric. If the value is deemed accurate, then it represents a thread-relative performance metric for that particular thread. If it is deemed inaccurate, then that fact may be recorded and used as part of a post-processing analysis.

It should be noted that the value of the performance metric of interest could be a kernel variable, which the kernel would map to a kernel-maintained memory area for user-space access. Alternatively, a global counter may contain a variable that is already somewhat accessible to the user-space, e.g., a global counter maintained in the JVM's address space, such as a count of bytes allocated from the Java heap. In any case, system calls to the kernel are eliminated and replaced by simple memory reads.

For each of the three embodiments above, at some point after the collection of a performance metric, probably during post-processing, the thread-relative performance metric may be reported to a user in some manner. The report can be enhanced by tracking more than just the mean performance metric or consumed resource. One can also track the distribution, e.g., the second moment, which provides a good indication of whether there is much variability in the reported metric.

For example, the classic use of a global counter is the situation in which the global counter is read at the entry and exit of a routine in order to attribute resource consumption by the currently executing thread to that specific routine. This can be done in a variety of ways. In one example, it can be accumulated into a counter associated with that thread and routine (e.g., using a two dimensional array, COUNT[routine_id, thread_id]=COUNT[routine_id, thread_id]+delta_value). In another example, the metric could be recorded in a trace buffer maintained in user-space. In a third example, the metric could be recorded in a data structure that tracks calling sequences and resources consumed along different calling paths.

Instead of simply accumulating the delta value at the exit of the instrumented method, if one records key aspects of the distribution of occurrences, e.g., the values themselves, the second moment of the values, and the minimum and maximum values, then this data can be further examined to help qualify the validity of the data recorded.

For example, suppose after some number of exits of method A, a history of elapsed instructions were executed in the manner shown in Table 1.

TABLE 1

| Invocation number | Delta number of instructions | Delta number of dispatches/interrupts |
|---|---|---|
| 1 | 55 | 0 |
| 2 | 55 | 0 |
| 3 | 55 | 0 |
| 4 | 10,601 | 0 |
| 5 | 55 | 0 |
| 6 | 55 | 0 |

There is some evidence in Table 1 that invocation number 4 was anomalous. It may have occurred because of an undetected thread switch or interrupt occurring. In this case, one can (with some human intervention and interpretation) posit the removal of that invocation from the sample.

Alternatively, one might observe the execution history of a number of exits of method A as shown in Table 2.

TABLE 2

| Invocation number | Delta number of instructions | Delta number of dispatches/interrupts |
|---|---|---|
| 1 | 255 | 1 |
| 2 | 255 | 1 |
| 3 | 255 | 1 |
| 4 | 255 | 1 |
| 5 | 255 | 1 |
| 6 | 255 | 1 |

There is evidence in Table 2 that, while there were some number of interrupts and dispatches, the instruction path length is nonetheless constant. An experienced analyst might use this information to conclude that the interrupts/dispatches in this case were actually synchronous, so resources consumed during these invocations should be attributed to the thread.

In both cases shown in Table 1 and Table 2, one uses the information about the distribution of the metric of interest to further qualify the validity of the data collected. This information is being used in conjunction with the interrupt and dispatch counts to provide further help with the interpretation of the data. In all cases, this requires a mode of analysis that is more post-processing in nature.

It is important to note that while the present invention has been described in the context of a fully functioning data processing system, those of ordinary skill in the art will appreciate that the processes of the present invention are capable of being distributed in the form of a computer readable medium of instructions and a variety of other forms and that the present invention applies equally regardless of the particular type of signal bearing media actually used to carry out the distribution. Examples of computer readable media include media such as EPROM, ROM, tape, paper, floppy disc, hard disk drive, RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring the performance of an application executing in a data processing system, the method comprising:

reading a first counter to get a first performance metric beginning value for a first performance metric;

reading a second counter to get a second performance metric beginning value for a second performance metric;

executing at least a portion of the application;

reading the first counter to get a first performance metric ending value;

reading the second counter to get a second performance metric ending value;

computing a first performance metric delta value from the first performance metric beginning value and the first performance metric ending value;

computing a second performance metric delta value from the second performance metric beginning value and the second performance metric ending value; and determining whether the first performance metric delta value is reliable as a thread-relative performance metric value representing the first performance metric during the execution of the portion of the application based upon whether the second performance metric delta value is zero.

2. The method of claim 1 wherein the first counter and the second counter are performance monitor counters in a processor in the data processing system, and wherein the first counter and the second counter are read directly by application-level code.

3. The method of claim 1 wherein the first counter is a performance monitor counter in a processor in the data processing system and the second counter is a kernel-maintained counter, and wherein the first counter and the second counter are read directly by application-level code.

4. The method of claim 3 wherein the second counter is in a kernel-mapped area of memory.

5. The method of claim 1 wherein the first counter and the second counter are kernel-maintained counters, and wherein the first counter and the second counter are read directly by application-level code from a kernel-mapped area of memory.

6. The method of claim 1 wherein the second performance metric represents a number of interrupts.

7. The method of claim 3 wherein the second performance metric represents a number of thread dispatch events.

8. The method of claim 1 wherein the first performance metric beginning value and the second performance metric beginning value are read substantially near an invocation of a routine and wherein the first performance metric ending value and the second performance metric ending value are read substantially near an end of the routine.

9. The method of claim 1 wherein the thread-relative performance metric value is accumulated on a thread-relative basis during the execution of the application.

10. The method of claim 1 wherein the thread-relative performance metric value is reported as a portion of thread-relative performance data.

11. The method of claim 1 wherein the first performance metric delta value, the second performance metric delta value, the first performance metric beginning value, the second performance metric beginning value, the first performance metric ending value, and/or the second performance metric ending value are reported as a portion of performance data for use in statistical, post-processing after the execution of the application.

12. A data processing system comprising:
  first reading means for reading a first counter to get a first performance metric beginning value for a first performance metric;
  second reading means for reading a second counter to get a second performance metric beginning value for a second performance metric;
  execution means for executing at least a portion of the application;
  third reading means for reading the first counter to get a first performance metric ending value;
  fourth reading means for reading the second counter to get a second performance metric ending value;
  first computing means for computing a first performance metric delta value from the first performance metric beginning value and the first performance metric ending value;
  second computing means for computing a second performance metric delta value from the second performance metric beginning value and the second performance metric ending value; and
  determining means for determining whether the first performance metric delta value is reliable as a thread-relative performance metric value representing the first performance metric during the execution of the portion of the application based upon whether the second performance metric delta value is zero.

13. The data processing system of claim 12 wherein the first counter and the second counter are performance monitor counters in a processor in the data processing system, and wherein the first counter and the second counter are read directly by application-level code.

14. The data processing system of claim 12 wherein the first counter is a performance monitor counter in a processor in the data processing system and the second counter is a kernel-maintained counter, and wherein the first counter and the second counter are read directly by application-level code.

15. The data processing system of claim 14 wherein the second counter is in a kernel-mapped area of memory.

16. The data processing system of claim 12 wherein the first counter and the second counter are kernel-maintained counters, and wherein the first counter and the second counter are read directly by application-level code from a kernel-mapped area of memory.

17. The data processing system of claim 12 wherein the second performance metric represents a number of interrupts.

18. The data processing system of claim 14 wherein the second performance metric represents a number of thread dispatch events.

19. The data processing system of claim 12 wherein the first performance metric beginning value and the second performance metric beginning value are read substantially near an invocation of a routine and wherein the first performance metric ending value and the second performance metric ending value are read substantially near an end of the routine.

20. The data processing system of claim 12 wherein the thread-relative performance metric value is accumulated on a thread-relative basis during the execution of the application.

21. The data processing system of claim 12 wherein the thread-relative performance metric value is reported as a portion of thread-relative performance data.

22. The data processing system of claim 12 wherein the first performance metric delta value, the second performance metric delta value, the first performance metric beginning value, the second performance metric beginning value, the first performance metric ending value, and/or the second performance metric ending value are reported as a portion of performance data for use in statistical, post-processing after the execution of the application.

23. A computer program product in a computer-readable medium for use in a data processing system for monitoring the performance of an application executing in the data processing system, the computer program product comprising:
  instructions for reading a first counter to get a first performance metric beginning value for a first performance metric;
  instructions for reading a second counter to get a second performance metric beginning value for a second performance metric;
  instructions for executing at least a portion of the application;
  instructions for reading the first counter to get a first performance metric ending value;
  instructions for reading the second counter to get a second performance metric ending value;
  instructions for computing a first performance metric delta value from the first performance metric beginning value and the first performance metric ending value;
  instructions for computing a second performance metric delta value from the second performance metric beginning value and the second performance metric ending value; and
  instructions for determining whether the first performance metric delta value is reliable as a thread-relative performance metric value representing the first performance metric during the execution of the portion of the application based upon whether the second performance metric delta value is zero.

24. The computer program product of claim 23 wherein the first counter and the second counter are performance monitor counters in a processor in the data processing system, and wherein the first counter and the second counter are read directly by application-level code.

25. The computer program product of claim 23 wherein the first counter is a performance monitor counter in a processor in the data processing system and the second counter is a kernel-maintained counter, and wherein the first counter and the second counter are read directly by application-level code.

26. The computer program product of claim 25 wherein the second counter is in a kernel-mapped area of memory.

27. The computer program product of claim 23 wherein the first counter and the second counter are kernel-maintained counters, and wherein the first counter and the second counter are read directly by application-level code from a kernel-mapped area of memory.

28. The computer program product of claim 23 wherein the second performance metric represents a number of interrupts.

29. The computer program product of claim 25 wherein the second performance metric represents a number of thread dispatch events.

30. The computer program product of claim 23 wherein the first performance metric beginning value and the second performance metric beginning value are read substantially near an invocation of a routine and wherein the first performance metric ending value and the second performance metric ending value are read substantially near an end of the routine.

31. The computer program product of claim 23 wherein the thread-relative performance metric value is accumulated on a thread-relative basis during the execution of the application.

32. The computer program product of claim 23 wherein the thread-relative performance metric value is reported as a portion of thread-relative performance data.

33. The computer program product of claim 23 wherein the first performance metric delta value, the second performance metric delta value, the first performance metric beginning value, the second performance metric beginning value, the first performance metric ending value, and/or the second performance metric ending value are reported as a portion of performance data for use in statistical, post-processing after the execution of the application.

* * * * *